United States Patent
Kamatani et al.

(10) Patent No.: US 9,600,475 B2
(45) Date of Patent: Mar. 21, 2017

(54) SPEECH TRANSLATION APPARATUS AND METHOD

(71) Applicant: KABUSHIKI KAISHA TOSHIBA, Minato-ku, Tokyo (JP)

(72) Inventors: Satoshi Kamatani, Kanagawa (JP); Kazuo Sumita, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/848,338

(22) Filed: Sep. 9, 2015

(65) Prior Publication Data

US 2016/0085747 A1    Mar. 24, 2016

(30) Foreign Application Priority Data

Sep. 18, 2014   (JP) ................................. 2014-190411

(51) Int. Cl.
*G06F 17/28*     (2006.01)
*G10L 25/48*     (2013.01)
*G10L 15/26*     (2006.01)

(52) U.S. Cl.
CPC ............ *G06F 17/289* (2013.01); *G10L 15/26* (2013.01); *G10L 25/48* (2013.01)

(58) Field of Classification Search
CPC ..................................................... G10L 15/26
See application file for complete search history.

(56) References Cited

U.S. PATENT DOCUMENTS

| 6,424,946 | B1 * | 7/2002 | Tritschler ............ G06F 17/3074 704/251 |
| 6,556,972 | B1 * | 4/2003 | Bakis .................... G06F 17/289 704/2 |
| 8,401,839 | B2 * | 3/2013 | Kim .................... G06F 17/2818 704/4 |
| 2007/0133437 | A1 * | 6/2007 | Wengrovitz ............ H04M 3/56 370/260 |
| 2008/0300872 | A1 * | 12/2008 | Basu ................. G06F 17/30017 704/235 |
| 2009/0157380 | A1 * | 6/2009 | Kim .................... G06F 17/2818 704/4 |

(Continued)

FOREIGN PATENT DOCUMENTS

EP         1093059 A2    4/2001
JP      2000322077 A    11/2000

(Continued)

*Primary Examiner* — Douglas Godbold
(74) *Attorney, Agent, or Firm* — Holtz, Holtz & Volek PC

(57) ABSTRACT

According to one embodiment, a speech translation apparatus includes a speech recognizer, a detector, a machine translator and a controller. The speech recognizer performs a speech recognition processing in chronological order on utterances of at least one first language made by a plurality of speakers to obtain a recognition text as a speech recognition result. The detector detects segments of meaning of the recognition text to obtain segments of text. The machine translator translates the segments of text into a second language different from the first language to obtain translated texts. The controller controls, if an utterance overlaps with another utterance in the chronological order, an order of displaying the translated texts corresponding to the overlapped utterances.

17 Claims, 7 Drawing Sheets

(56) References Cited

U.S. PATENT DOCUMENTS

| | | | |
|---|---|---|---|
| 2009/0306981 A1* | 12/2009 | Cromack | G06F 17/30743 704/235 |
| 2011/0112833 A1* | 5/2011 | Frankel | G10L 15/32 704/235 |
| 2011/0213607 A1* | 9/2011 | Onishi | H04N 7/147 704/2 |
| 2011/0307241 A1* | 12/2011 | Waibel | G10L 15/265 704/2 |
| 2013/0144603 A1* | 6/2013 | Lord | H04L 12/1831 704/9 |
| 2013/0211818 A1 | 8/2013 | Sakamoto et al. | |
| 2013/0262076 A1 | 10/2013 | Kamatani et al. | |
| 2014/0019129 A1* | 1/2014 | Bodin | H04L 29/06027 704/235 |
| 2014/0095151 A1 | 4/2014 | Sakamoto et al. | |
| 2014/0337989 A1* | 11/2014 | Orsini | H04L 51/12 726/26 |
| 2015/0081272 A1* | 3/2015 | Kamatani | G10L 15/18 704/2 |
| 2015/0213008 A1* | 7/2015 | Orsini | G06F 17/28 704/2 |
| 2015/0262209 A1* | 9/2015 | Orsini | G06F 17/2854 705/14.11 |
| 2016/0179831 A1* | 6/2016 | Gruber | G10L 15/26 704/235 |

FOREIGN PATENT DOCUMENTS

| | | |
|---|---|---|
| JP | 2001117920 A | 4/2001 |
| JP | 2002101205 A | 4/2002 |
| JP | 2006050500 A | 2/2006 |
| JP | 2013206253 A | 10/2013 |
| JP | 2015060127 A | 3/2015 |
| JP | 5727980 B2 | 6/2015 |
| JP | 5750380 | 7/2015 |
| JP | 2015201215 A | 11/2015 |

* cited by examiner

SPEECH TRANSLATION APPARATUS AND METHOD

CROSS-REFERENCE TO RELATED APPLICATIONS

This application is based upon and claims the benefit of priority from Japanese Patent Application No. 2014-190411, filed Sep. 18, 2014, the entire contents of which are incorporated herein by reference.

FIELD

Embodiments described herein relate generally to a speech translation apparatus and method.

BACKGROUND

Speech processing techniques have been developed, and a speech translation apparatus, in which an input of a first language is translated into a second language and an output of the second language is obtained, has been achieved. The format of input and output are texts or sounds, depending on applications. However, the basic technique of translating a person's speech is commonly used in the applications.

The speech translation technique can be applied to displaying subtitles of translated languages, or speech output of translated languages in a meeting or a lecture. One example of a speech translation technique is a subtitling system for conferencing.

DETAILED DESCRIPTION

Figure 1:
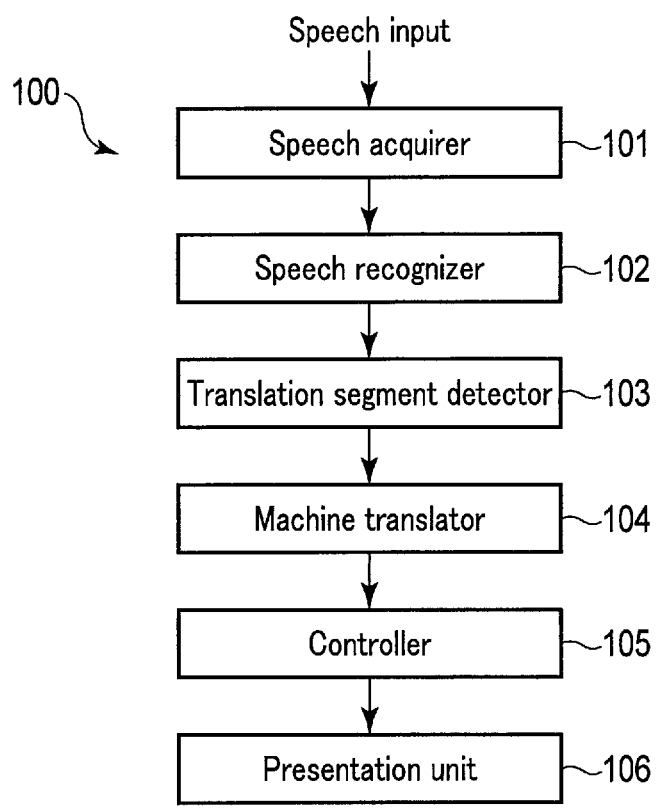
FIG. 1 is a block diagram showing a speech translation apparatus.

Usually, translation results are presented after a segment of speech to be translated ends. There may be a problem in which a user misinterprets the translation results due to a timing when the translation results are presented.

In general, according to one embodiment, a speech translation apparatus includes a speech recognizer, a detector, a machine translator and a controller. The speech recognizer performs a speech recognition processing in chronological order on utterances of at least one first language made by a plurality of speakers to obtain a recognition text as a speech recognition result. The detector detects segments of meaning of the recognition text to obtain one or more segments of text. The machine translator translates the one or more segments of text into a second language different from the first language to obtain one or more translated texts. The controller controls, if an utterance overlaps with another utterance in the chronological order, an order of displaying the translated texts corresponding to the overlapped utterances.

Hereinafter, the speech translation apparatus, method and program according to the present embodiment will be described in detail with reference to the drawings.

In the following embodiments, the elements which perform the same operations will be assigned the same reference numerals, and redundant explanations will be omitted.

A speech translation apparatus according to the first embodiment will be described with reference to the block diagram of FIG. 1.

The speech translation apparatus 100 according to the embodiment includes a speech acquirer 101, a speech recognizer 102, a translation segment detector 103, a machine translator 104, a controller 105, and a presentation unit 106.

The speech acquirer 101 acquires an utterance of a first language from a speaker as a speech signal. The speech acquirer 101 also acquires speaker information indicating information on the speaker who gave the utterance, and acquires time information indicating a time of day when the speech signal is acquired and a duration (time duration) of the speech signal that are associated with the speech signal. The first language includes at least one language.

The speech signal is obtained by collecting sound through a microphone and processing it by an analog-to-digital (A/D) converter, for example. The speech signal may be obtained by reproducing speech that was stored in a recording medium by a reproduction device.

The speech recognizer 102 receives a speech signal, speaker information, and time information from the speech acquirer 101, performs speech recognition processing on the speech signal in chronological order, and obtains a recognition text as a speech recognition result of the speech signal.

The speech recognition processing may be performed by a general technique such as a Hidden Markov Model (HMM), and an explanation thereof is omitted.

The translation segment detector 103 receives the recognition text, the speaker information, and the time information from the speech recognizer 102, and divides the recognition text into segments of text. Each segments of text is divided based on segments of meaning suitable for translation processing.

Since speech does not have clear punctuation as is used in written text, the speech needs to be divided into segments suitable for translation processing to accomplish simultaneous high quality speech translation. Segments suitable for translation processing may be obtained by dividing a recognition text according to meaning for which the best translation result can be obtained by translating speech input to the machine translation apparatus simultaneously. The segments can be obtained by using a conventional method, and an explanation thereof is omitted.

Since segments of meaning have to be set depending on the language, the translation segment detector 103 may determine segments of meaning in accordance with the first language.

The machine translator 104 receives the segments of text, the speaker information, and the time information from the translation segment detector 103, translates each of the segments of text into a second language different from the first language, and obtains a translated text for each segment. The translation processing may be performed by applying various methods such as a transfer method, usage example-based method, statistics-based method, and an inter-language method used in conventional machine translation technology, and an explanation thereof is omitted.

The controller 105 receives the translated text, the segments of text, the speaker information, and the time information from the machine translator 104.

The controller 105 refers to the speaker information and the time information to detect an overlap of utterances in chronological order. If an overlapped utterance is detected, the controller 105 controls display of texts in the presentation unit 106 described later to change the order of the translated text corresponding to the overlapped utterance. The order of display is changed based on the translated text already presented to the speaker, and the status where an utterance of another speaker occurs. This will be explained later in detail.

The presentation unit 106 is a display device such as a liquid crystal display (LCD) or an organic light emitting diode (OLED) display. The presentation unit 106 receives a translated text and segments of text from the controller 105, and presents them to a user. The segments of text may be received from the speech recognizer 102. The presentation unit 106 is not limited to a display device, but may be a printing device, a speech device such as a speaker, or a storage device such as a hard disk drive that records data into a storage medium.

The translated text and the segments of text may be output as sound by performing speech synthesis processing. The speech synthesis processing is performed by applying conventionally used various methods such as speech synthesis by editing speech segments, formant synthesis, speech corpus-based speech synthesis, text-to-speech, etc. When applying the speech synthetic processing, the controller 105 may change the order of output or change the length of pause between utterances when an overlapped utterance is detected, instead of changing the order of display.

In the present embodiment, it is assumed that translation is performed between the first language and the second language, the first language being English and Chinese, and the second language being Japanese. However, the first and second languages may be other languages, and multiple languages may be processed by using the method explained in the present embodiment.

The speaker information and the time information may be associated and stored in a buffer (not shown in the drawings) every time a segment of text and the corresponding translated text are generated. The controller 105 may change the order of displaying the translated texts by referring to the speaker information and the time information stored in the buffer.

Figure 2:
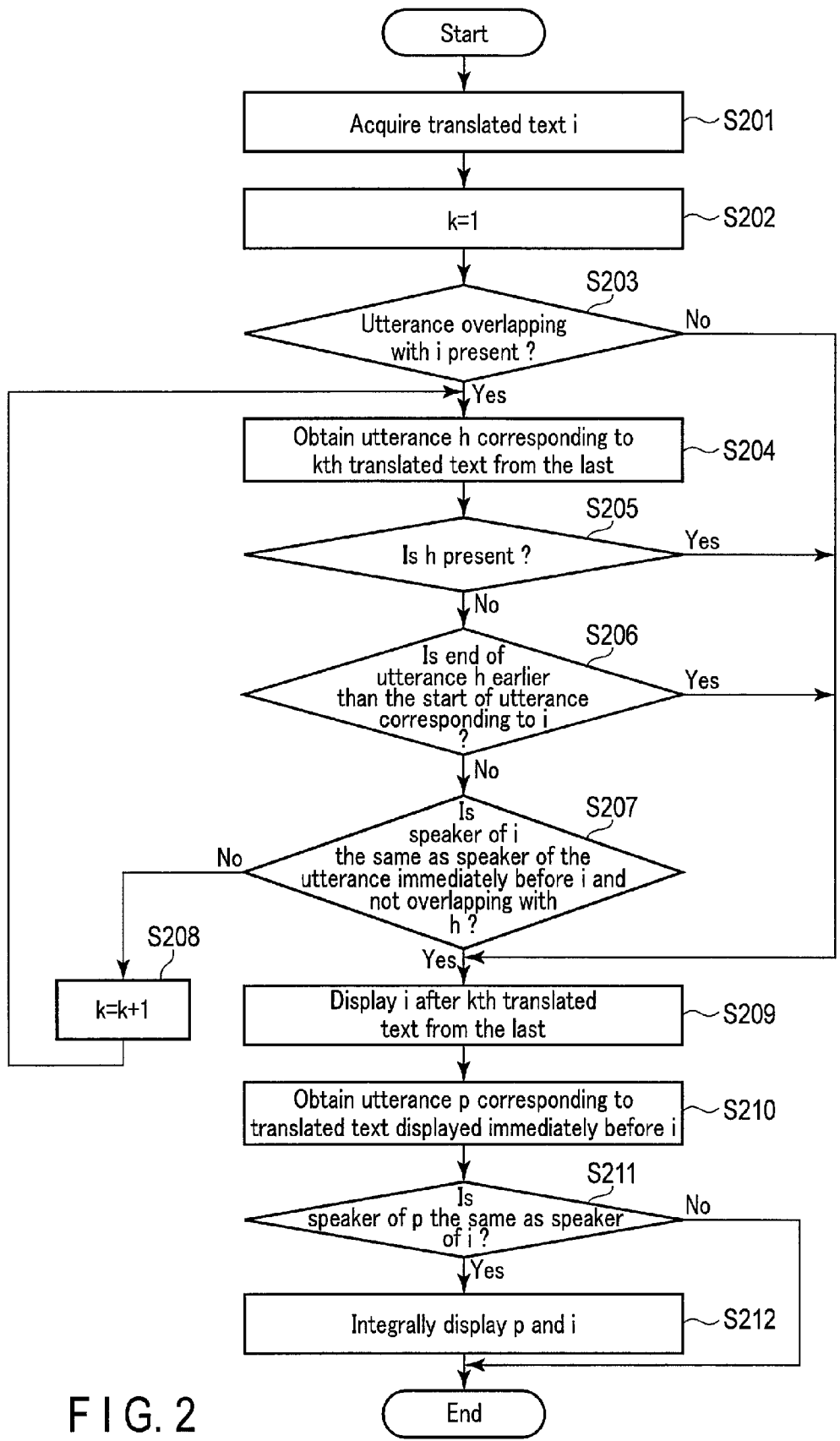
FIG. 2 is a flowchart illustrating a control process at a controller.

Next, the process for controlling the order of display at the controller 105 will be explained with reference to the flowchart of FIG. 2.

In step S201, the controller 105 acquires a translated text i corresponding to an utterance to be processed (hereinafter, also referred to as "target utterance").

In step S202, the controller 105 sets an internal variable k to be one (k=1) to control the display of the translated text.

In step S203, the controller 105 determines whether or not there is an utterance overlapping with an utterance corresponding to the translated text i. The above determination may be performed by comparing the time information for the translated text i with the time information for the translated text of another utterance of another speaker, and determining whether or not the duration of the utterance corresponding to the translated text i overlaps with the duration of the other utterance. When there is an overlap between them, the process proceeds to step S204. When there is no overlap, the process proceeds to step S209.

In step S204, the controller 105 obtains an utterance h corresponding to the kth translated text from the last translated text presented on the presentation unit 106.

In step S205, the controller 105 determines whether or not the utterance h is blank (utterance h is present). If the utterance h is blank, the process proceeds to step S209; if the utterance h is not blank, the process proceeds to step S206. When processing the first translated text, there is no preceding translated text, and accordingly, the utterance h should be blank.

In step S206, the controller 105 determines whether or not the end point of the duration of the utterance h is earlier than the start point of the duration of the utterance corresponding to the translated text i. If the end point of the duration of the utterance h is earlier than the start point of the duration of the utterance corresponding to the translated text i, the process proceeds to step S209; if not, the process proceeds to step S207.

In step S207, the controller 105 determines whether or not the speaker of the utterance corresponding to the translated text i is the same as the speaker of the utterance immediately before the utterance corresponding to the translated text i among the utterances immediately prior to the utterance corresponding to the translated text i and not overlapping with the utterance h. If the speakers are the same, the process proceeds to step S209; if the speakers are different, the process proceeds to step S208.

In step S208, k is incremented by one. Then, the process returns to step S204, and the same steps are repeated.

In step S209, the controller 105 controls the presentation unit 106 to present the translated text i after the kth translated text from the last translated text.

In step S210, the controller 105 obtains an utterance p corresponding to the translated text presented one before the translated text i.

In step S211, the controller 105 determines whether or not the speaker of the utterance p is the same as the speaker of the utterance corresponding to the translated text i. If the speakers are the same, the process proceeds to step S212; if not, the process is terminated. When processing the first translated text, there is no speaker identical to one for the translated text i, and the process is terminated.

In step S212, the display of the utterance p and the translated text i are combined within the same window. The control process of the controller 105 is then ended.

Next, the first example of the operation of the speech translation apparatus 100 based on the control process of the controller 105 shown in FIG. 2 will be explained with reference to FIG. 3.

Figure 3:
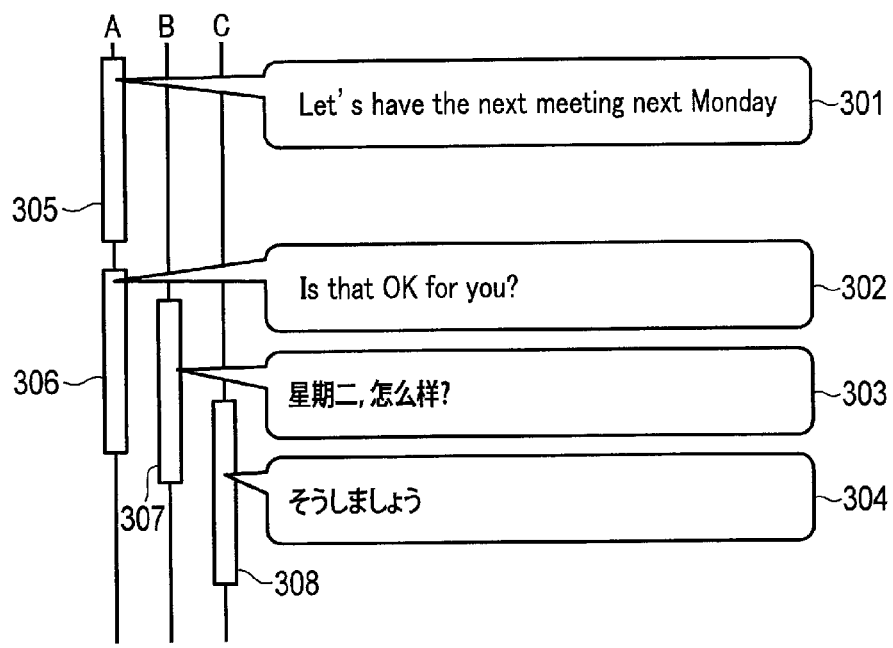
FIG. 3 illustrates the first example of an operation of the speech translation apparatus.

FIG. 3 illustrates utterances given in chronological order by three speakers A, B, and C who speak different languages. The utterance given earlier (temporally preceding) is presented at a higher position. In FIG. 3, it is assumed that speaker A speaks English, speaker B speaks Chinese, and speaker C speaks Japanese. Utterances 301 to 304 are interaction balloons indicating what a speaker spoke (segment of text). Durations 305 to 308 indicate a duration of time of each of utterances 301 to 304.

In the present embodiment, it is assumed that processing is performed from an utterance with the earliest start time (also referred to as "start of utterance"). In FIG. 3, processing is performed from utterance 301, to utterance 302, to utterance 303, then to utterance 304.

It is assumed that speaker A made utterance 301, "Let's have the next meeting next Monday".

When the translated text i corresponding to the utterance 301 is generated, the controller 105 obtains the translated text i as a target utterance, and sets k to be one (k=1).

Since there is no overlap with the duration 305 of the utterance 301, the translated text of utterance 301 is displayed first at the last of the displayed text on the presentation unit 106. In this situation, the utterance 301 is the first utterance, and no other translated text is displayed on the presentation unit 106. Accordingly, the translated text of utterance 301 is displayed first. Then, the utterance corresponding to the translated text displayed immediately before utterance 301 is to be obtained. However, there is no other utterance, and accordingly, the process is ended.

Next, it is assumed that speaker A made an utterance 302, "Is that OK for you?".

When the translated text i corresponding to the utterance 302 is generated, the controller 105 obtains the translated text i as a target utterance, and sets k to be one (k=1).

Since the durations of the utterances 303 and 304 overlap with the duration 306 of the utterance 302, the kth utterance from the last utterance displayed on the presentation unit 106, that is, the utterance 301 which corresponds to the translated text displayed at the last, is acquired. Comparing the duration 305 with the duration 306, the end of the utterance 301 is earlier than the start of the utterance 302. In addition, the speaker of the utterance 301 is the same as that of the utterance 302. Accordingly, the utterances 301 and 302 are combined, and displayed within a single box.

Next, it is assumed that the speaker B made utterance 303 "星期二，怎么样?(How about next Tuesday?)".

When the translated text i corresponding to the utterance 303 is generated, the controller 105 obtains the translated text i as a target utterance, and sets k to be one (k=1).

Since the durations of the utterances 302 and 304 overlap with the duration 307 of the utterance 303, the kth utterance from the last utterance displayed on the presentation unit 106, that is, the utterance 302 which corresponds to the translated text displayed at the last, is acquired. Comparing the duration 306 with the duration 307, the end of the utterance 302 is later than the start of the utterance 303. The utterance immediately before the utterance 303 and not overlapping with the utterance 303 is the utterance 301, and the speaker of the utterance 301 is the speaker A, different from the speaker B of the utterance 303. Then, k is incremented by one to be two (k=2).

Next, the kth utterance from the last utterance displayed on the presentation unit 106, that is, the utterance 301 which corresponds to the second translated text from the last, is acquired.

Comparing the duration 305 with the duration 307, the end of the utterance 301 is earlier than the start of the utterance 303. Accordingly, the utterance 303 is displayed after the utterance 301. In addition, since the speaker of the utterance 303 is different from the speaker of the utterance 301, the display control relative to the utterance 303 is ended. By this action, the utterance 303 is displayed in chronological order prior to the utterance 302 that has been already displayed.

Next, it is assumed that the speaker C made the utterance 304 "そうしましょう (That sounds good.)".

When the translated text i corresponding to the utterance 304 is generated, the controller 105 obtains the translated text i as a target utterance, and sets k to be one (k=1).

The durations of the utterances 302 and 303 overlap with the duration 308 of the utterance 304. Thus, the kth utterance from the last displayed on the presentation unit 106, that is, the utterance 302 which corresponds to the last translated text, is acquired. Comparing the duration 306 with the duration 308, the end of the utterance 302 is later than the start of the utterance 304. In addition, the utterance immediately before the utterance 304 and not overlapping with the utterance 304 is the utterance 301, and the speaker of the utterance 301 is speaker A, different from the speaker C of the utterance 304. Then, k is incremented by one to be two (k=2).

Next, the utterance 303 which corresponds to the second translated text from the last displayed on the presentation unit 106 is acquired. Comparing the duration 307 with the duration 308, the end of the utterance 303 is later than the start of the utterance 304. The speaker of the utterance 301, which is immediately before the utterance 304 and not overlapping with the utterance 304, is the speaker A different from the speaker C of the utterance 304. Then, k is further incremented by one to be three (k=3).

Next, the utterance 301, which corresponds to the third translated text from the last utterance displayed on the presentation unit 106, is acquired. Comparing the duration 305 with the duration 308, the end of the utterance 301 is earlier than the start of the utterance 304. Accordingly, the translated text corresponding to the utterance 304 is displayed after the utterance 301. Since the speaker of the utterance 304 is different from the speaker of the utterance 301, the display control relative to the utterance 304 is ended. By this action, the utterance 304 is displayed in chronological order prior to the utterances 303 and 302 that have been already displayed. As a result, the translated texts for the utterance 301, the utterance 304, the utterance 303, and the utterance 302 are displayed in the order given.

Figure 4:
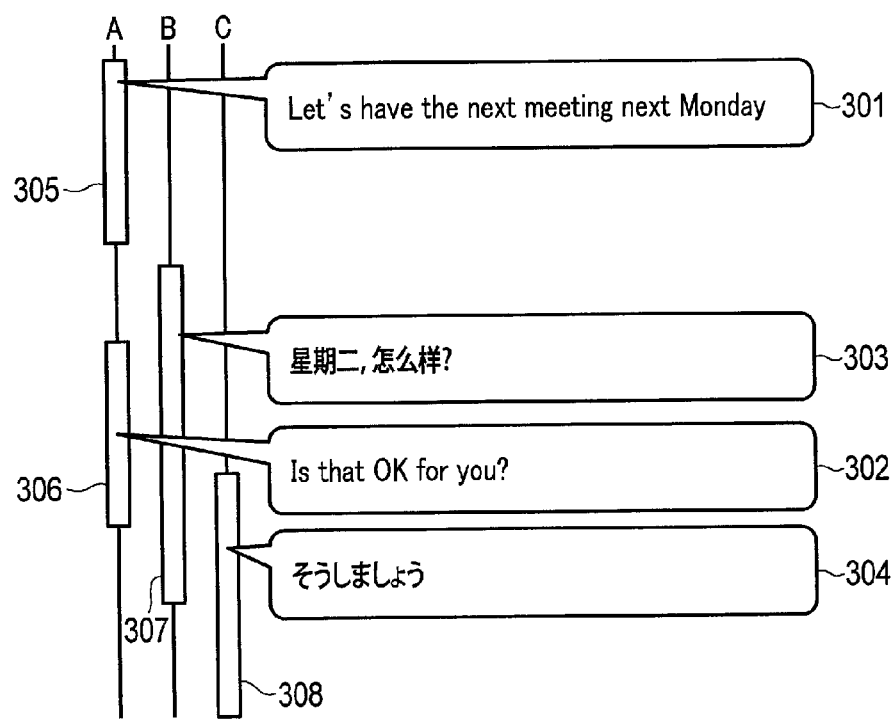
FIG. 4 illustrates the second example of an operation of the speech translation apparatus.

The second example of the operation of the speech translation apparatus 100 according to the embodiment with reference to FIG. 4 follows.

FIG. 4 is similar to FIG. 3, but illustrates the situation where the utterance 303 of the speaker B was made temporally prior to the utterance 302 of the speaker A. It is assumed that speaker B made the utterance 303 after the translated text of the utterance 301 is displayed.

When the translated text i corresponding to the utterance 303 is generated, the controller 105 obtains the translated text i as a target utterance, and sets k to be one (k=1).

Since the durations of the utterances 302 and 304 overlap with the duration 307 of the utterance 303, the utterance immediately before the last translated text displayed on the presentation unit 106, that is, the utterance 301, is acquired. Since the end of the utterance 301 is earlier than the start of the utterance 303, and the speaker of the utterance 301 is different from that of the utterance 303, the translated text of the utterance 303 is displayed immediately after the translated text of the utterance 301.

Next, it is assumed that speaker C made the utterance 302. The translated text i corresponding to the utterance 302 is generated, and the controller 105 obtains the translated text i as a target utterance, and sets k to be one (k=1).

Since the durations of the utterances 303 and 304 overlap with the duration 306 of the utterance 302, the utterance 303 immediately before the utterance 302 is acquired. The end of the utterance 303 is later than the start of the utterance 302, and the speaker of the utterance 301 that is immediately before the utterance 303 and does not overlap with the utterance 303 is the same as the speaker of the utterance 302. Accordingly, the translated text of the utterance 302 is displayed first from the last translated text on the presentation unit 106.

The processing similar to FIG. 3 is performed to the utterance 304. As a result, the translated texts for the utterance 301, the utterance 304, the utterance 303, and the utterance 302 are displayed in the order given.

Next, the first presentation example at the presentation unit 106 will be explained with reference to FIG. 5.

Figure 5:
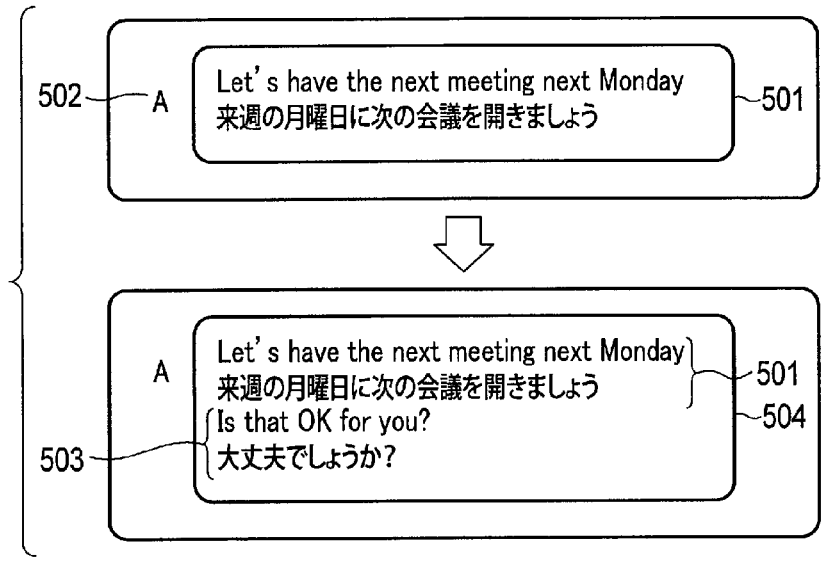
FIG. 5 illustrates the first display example at a presentation unit.

FIG. 5 illustrates the results of processing performed on the translated text of the utterance 302 shown in FIG. 3. FIG. 5 illustrates the situation where a single speaker continuously made multiple utterances without overlapping an utterance of another speaker.

An utterance display window 501 for the utterance 301 includes a segment of text at the top, and a translated text for the segment of text below. The utterance display window 501 also includes the speaker 502 of the utterance 301.

When the speaker A made the utterance 302, "Is that OK for you?", subsequently to the utterance "Let's have the next meeting next Monday", the controller 105 controls the presentation unit 106 to combine the display of translated texts of the utterances of the speaker A within the same display window.

By the control of the controller 105, the presentation unit 106 combines an utterance display window 503 of the utterance 302 and the utterance display window 501 of the utterance 301 into a single utterance display window 504. While a single speaker is continuously talking, translated texts of the speaker's utterances are associated with each other when being displayed. Accordingly, the continuity of utterances is greatly reflected in the translation results.

Next, the second presentation example at the presentation unit 106 will be explained with reference to FIG. 6.

Figure 6:
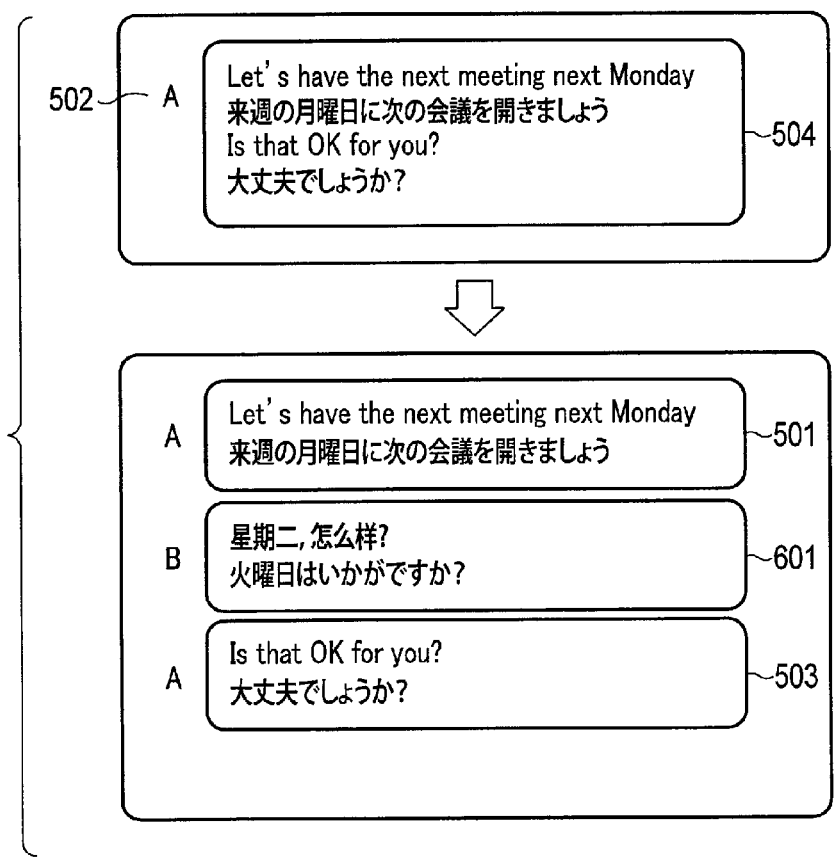
FIG. 6 illustrates the second display example at the presentation unit.

FIG. 6 illustrates the situation where the other speaker made utterances after the utterance display window 504 shown in FIG. 5 is displayed. The situation is the same as where the processing relative to the translated text of the utterance 303 in the example of FIG. 3 is completed.

As in the example shown in FIG. 3, the controller 105 controls the presentation unit 106 to display the utterance 303 immediately after the utterance 301. As a result, the presentation unit 106 divides the utterance display window 504 into the utterance display window 501 and the utterance display window 503, displays an utterance display window 601 of the utterance 303 immediately after the utterance display window 501, and displays the utterance display window 503 after the utterance display window 601.

Next, the third presentation example at the presentation unit 106 will be explained with reference to FIG. 7.

Figure 7:
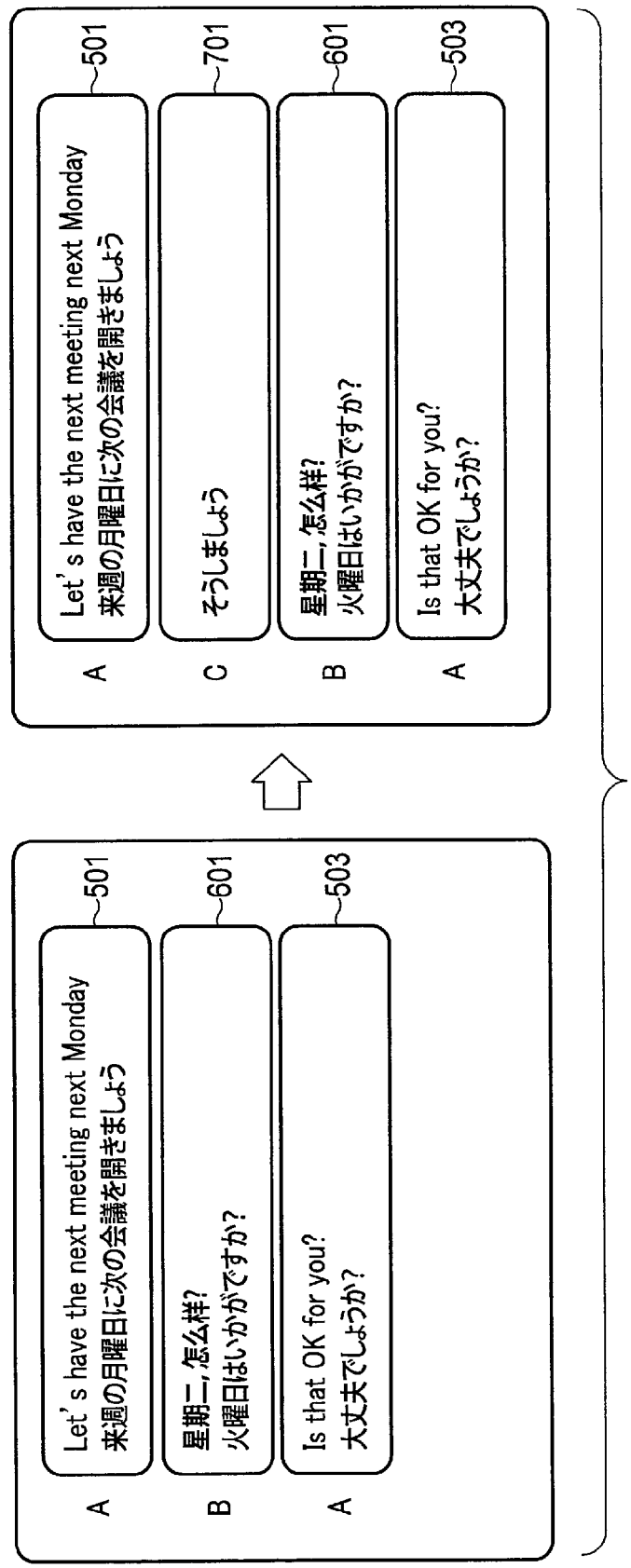
FIG. 7 illustrates the third display example at the presentation unit.

FIG. 7 illustrates the situation where the processing relative to the translated text of the utterance 304 shown in FIG. 3 is completed.

As in the example shown in FIG. 3, the controller 105 controls the presentation unit 106 to display the utterance 304 immediately after the utterance 301. Thus, the presentation unit 106 displays an utterance display window 701 of the utterance 403 immediately after the utterance display window 501, then sequentially displays the utterance display window 601 and the utterance display window 503.

The processing shown in FIGS. 6 and 7 clarifies the basis upon which translated text of an utterance that the speaker made an utterance, and enhances the understandability of translation results.

Next, the first modification example of controlling the display order at the controller 105 will be explained with reference to FIG. 8.

Figure 8:
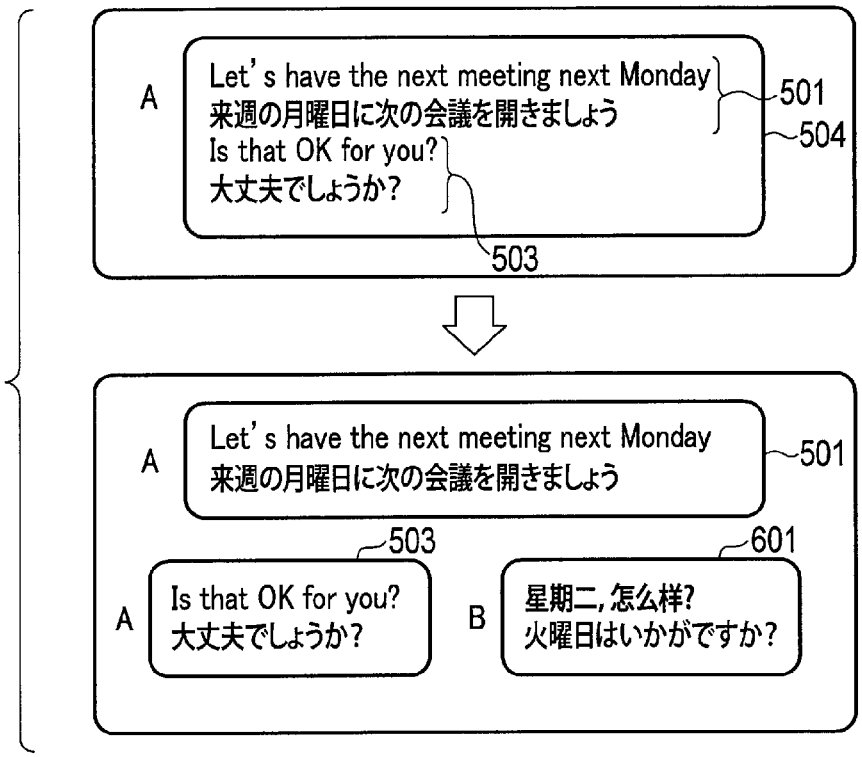
FIG. 8 illustrates the first modification example of the control process at the controller.

In the example of FIG. 8, the utterance display window 601 is not displayed temporally prior to the utterance display window 503, but displayed in parallel with the utterance display window 601. This also enhances the understandability of translation results.

Next, the second modification example of controlling the display order at the controller 105 will be explained with reference to FIG. 9.

Figure 9:
FIG. 9 illustrates the second modification example of the control process at the controller.

In the example of FIG. 9, an utterance that is determined to be displayed immediately after the preceding utterance is displayed with the current utterance as a group.

For example, the utterance display window 601 is determined to be displayed immediately after the utterance display window 501, and accordingly, the utterance display window 501 and the utterance display window 601 are displayed as a group.

According to the present embodiment, when multiple utterances temporally overlap, the order of displaying the utterances is based on the durations of utterances and the difference in speakers. This processing clarifies the continuity of a single speaker's utterances, and in response to which utterance a speaker made an utterance. Thus, the understandability of utterances is enhanced, and the possibility of misunderstanding of utterances is reduced.

In addition, it is possible to control the order of display based on the context by applying the discourse analysis. Furthermore, if a new translated text is controlled to be displayed before the already presented utterance, the translated text may be displayed in a lighter color or by shifting the display position as shown in FIG. 8, in order to emphasize discontinuity of a single speaker's utterances.

COMPARATIVE EXAMPLE

Figure 10:
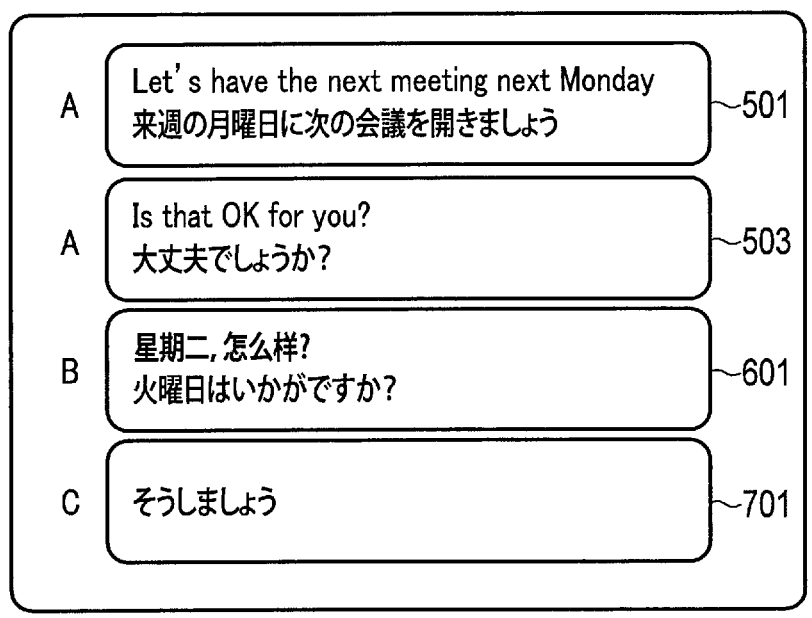
FIG. 10 illustrates a presentation of translation results by a conventional method.

A display example of translation results by a conventional technique will be explained as a comparative example, with reference to FIG. 10.

It is assumed that in response to utterances "Let's have the next meeting next Monday" and "Is that OK for you?" of speaker A displayed in the utterance display windows 501 and 503, speaker B made an utterance "星期二，怎么样?", and speaker C made an utterance "そうしましょう."

If the utterance of speaker B precedes the utterance of speaker C, an utterance display window 701 of speaker C is displayed after the utterance display window 601 of speaker B. In this situation, although the speaker C made an agreement to the utterance of the speaker A, "Let's have the next meeting next Monday", it may be misinterpreted that the speaker C made an agreement to the utterance of the speaker B, "星期二，怎么样?".

In contrast, the present embodiment clearly displays in response to which utterance a speaker made an utterance, and accordingly, misinterpretation as may occur in the comparative example will be decreased.

The flow charts of the embodiments illustrate methods and systems according to the embodiments. It is to be understood that the embodiments described herein can be implemented by hardware, circuit, software, firmware, middleware, microcode, or any combination thereof. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. A speech translation apparatus, comprising:
a processor; and
a memory storing instructions which when executed by the processor cause the processor to perform functions including:
performing a speech recognition processing in chronological order on utterances of at least one first language made by a plurality of speakers to obtain a recognition text as a speech recognition result;
detecting segments of meaning of the recognition text to obtain one or more segments of text;
machine translating the one or more segments of text into a second language different from the first language to obtain one or more translated texts; and
performing control, if an utterance overlaps with another utterance in the chronological order, an order of displaying the translated texts corresponding to the overlapped utterances based on a translated text which has been already displayed, durations of the overlapped utterances, and the speakers of the overlapped utterances.

2. The apparatus according to claim 1, wherein if multiple utterances made by a single speaker continue without overlapping with an utterance made by another speaker, the processor controls display of translated texts of the multiple utterances made by the single speaker to be combined.

3. The apparatus according to claim 1, wherein if a target utterance to be processed overlaps with another utterance, and a speaker of an utterance not overlapping with other utterances and displayed immediately before the target utterance is different from a speaker of the target utterance, the processor controls display of a translated text of the target utterance in the chronological order to precede a translated text of the another utterance that has already been displayed.

4. The apparatus according to claim 1, wherein if a target utterance to be processed overlaps with another utterance, the processor controls display of a translated text of the target utterance to be in parallel with a translated text of the another utterance.

5. The apparatus according to claim 1, wherein if a target utterance to be processed overlaps with another utterance, the processor controls display of a translated text of the target utterance and a translated text of an utterance displayed immediately before and not overlapping with the target utterance, as a set.

6. The apparatus according to claim 1, wherein the processor detects the segments of meaning in accordance with the first language.

7. The apparatus according to claim 1, wherein the processor detects an overlap between utterances based on whether or not a duration of an utterance corresponding to a translated text overlaps with a duration of another utterance of another speaker.

8. The apparatus according to claim 1, wherein each of the one or more segments of text is divided based on the segments of meaning suitable for translation processing.

9. A speech translation method, comprising:
performing a speech recognition processing in chronological order on utterances of at least one first language made by a plurality of speakers to obtain a recognition text as a speech recognition result;
detecting segments of meaning of the recognition text to obtain one or more segments of text;
translating the one or more segments of text into a second language different from the first language to obtain one or more translated texts; and
controlling, if an utterance overlaps with another utterance in the chronological order, an order of displaying the translated texts corresponding to the overlapped utterances based on a translated text which has been already displayed, durations of the overlapped utterances, and the speakers of the overlapped utterances.

10. The method according to claim 9, wherein if multiple utterances made by a single speaker continue without overlapping with an utterance made by another speaker, the controlling the order of display controls display of translated texts of the multiple utterances made by the single speaker to be combined.

11. The method according to claim 9, wherein if a target utterance to be processed overlaps with another utterance, and a speaker of an utterance not overlapping with other utterances and displayed immediately before the target utterance is different from a speaker of the target utterance, the controlling the order of display controls display of a translated text of the target utterance in the chronological order to precede a translated text of the another utterance that has already been displayed.

12. The method according to claim 9, wherein if a target utterance to be processed overlaps with another utterance, the controlling the order of display controls display of a translated text of the target utterance to be in parallel with a translated text of the another utterance.

13. The method according to claim 9, wherein if a target utterance to be processed overlaps with another utterance, the controlling the order of display controls display of a translated text of the target utterance and a translated text of an utterance displayed immediately before and not overlapping with the target utterance, as a set.

14. The method according to claim 9, wherein the detecting detects the segments of meaning in accordance with the first language.

15. The method according to claim 9, wherein the controlling the order of display detects an overlap between utterances based on whether or not a duration of an utterance corresponding to a translated text overlaps with a duration of another utterance of another speaker.

16. A non-transitory computer readable medium including computer executable instructions, wherein the instructions, when executed by a processor, cause the processor to perform a method comprising:
    performing a speech recognition processing in chronological order on utterances of at least one first language made by a plurality of speakers to obtain a recognition text as a speech recognition result;
    detecting segments of meaning of the recognition text to obtain one or more segments of text;
    translating the one or more segments of text into a second language different from the first language to obtain one or more translated texts; and
    controlling, if an utterance overlaps with another utterance in the chronological order, an order of displaying the translated texts corresponding to the overlapped utterances based on a translated text which has been already displayed, durations of the overlapped utterances, and the speakers of the overlapped utterances.

17. The medium according to claim 16, wherein if multiple utterances made by a single speaker continue without overlapping with an utterance made by another speaker, the controlling the order of display controls display of translated texts of the multiple utterances made by the single speaker to be combined.

* * * * *